Nov. 30, 1948.  J. A. HEVA  2,455,305
THERMOSTATIC DEVICE FOR DRAINING CONDENSATE
FROM STEAM CYLINDERS AND THE LIKE
Filed Dec. 21, 1945  2 Sheets-Sheet 1
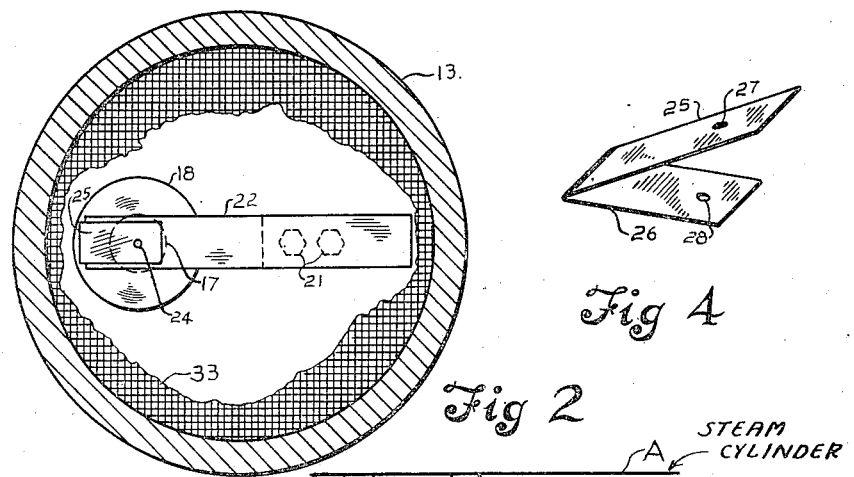
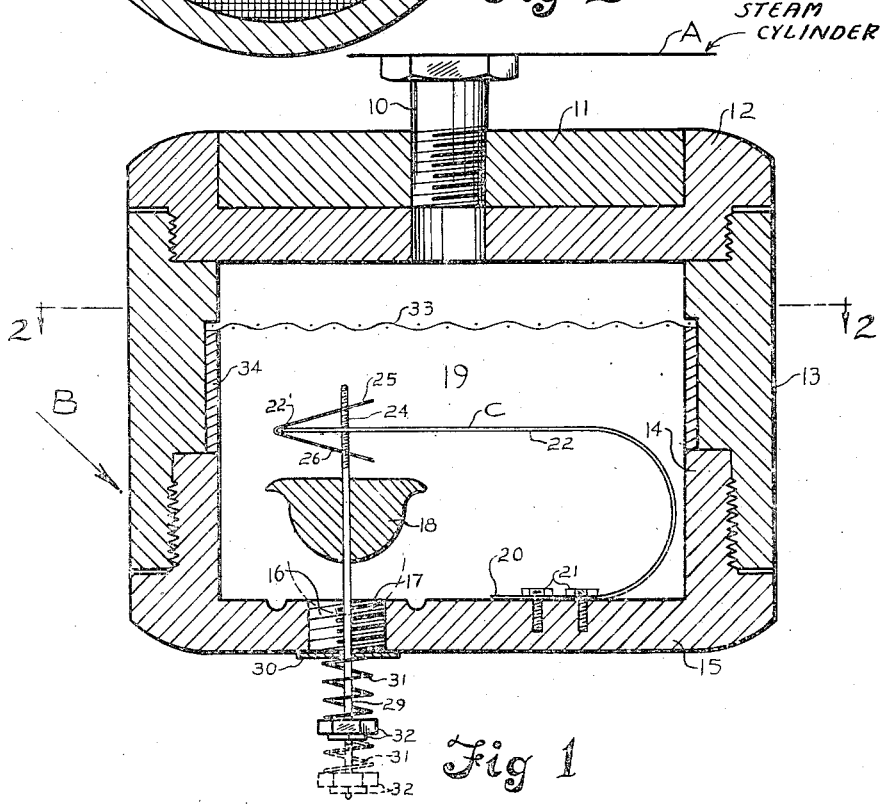
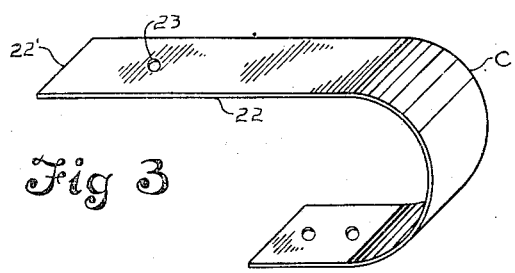
INVENTOR.
JACK A. HEVA
BY G. Ward Kemp
ATTORNEY

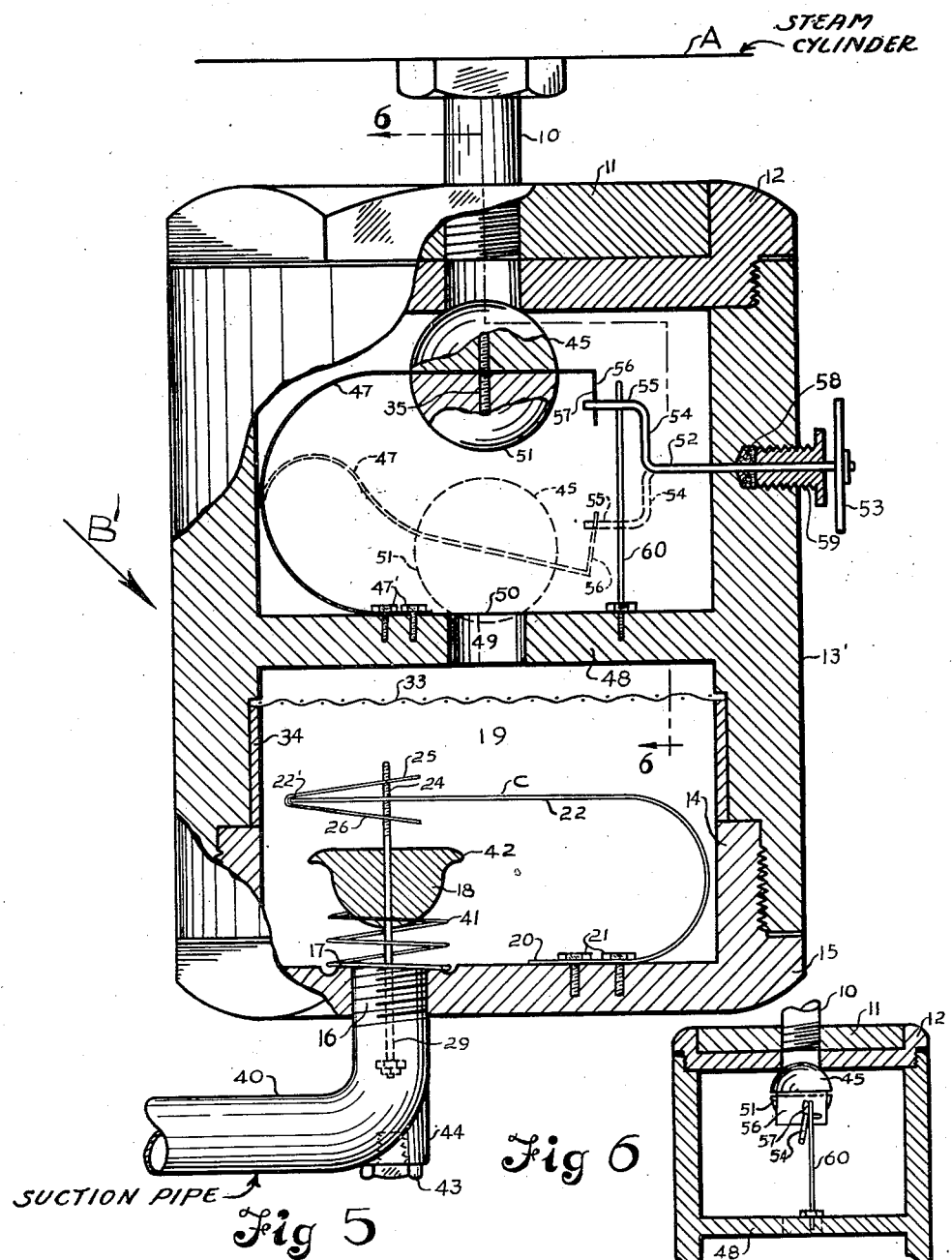

Patented Nov. 30, 1948

2,455,305

UNITED STATES PATENT OFFICE 2,455,305

THERMOSTATIC DEVICE FOR DRAINING CONDENSATE FROM STEAM CYLINDERS AND THE LIKE

Jack A. Heva, Seattle, Wash.

Application December 21, 1945, Serial No. 636,544

4 Claims. (Cl. 121—134)

This invention relates to thermostatic devices for automatically draining water from steam engine cylinders, steam pipes and the like, without loss of steam therefrom.

In the use of steam engines, damage is frequently caused by water that has become condensed from the steam, known as "condensate," which forms when an engine is stopped even for brief periods of time, particularly in cold weather. Such condensate when formed in a cylinder is practically non compressible and when the piston is actuated, the heads of the cylinders are sometimes blown off, or the pistons loosened from the rods, or other forms of damage done, besides retardation of power of the engine and difficulty in starting. In cold weather such difficulties are particularly frequent where the engines may be used for hoisting winches, and where stops are frequent. When such condensate is formed in cylinders, and pipes, and other steam containers, and left undrained for periods of time sufficient for freezing in cold weather the ice formed therein is often sufficient to burst or injure cylinders or other containers.

Attempts have been made to provide cocks and valves for manual use in draining such cylinders and containers, but they have been unsatisfactory, and, frequently, they are overlooked or forgotten when they should have been opened, and in such forms of outlets usually a considerable supply of steam is lost before they can be closed after water has been discharged. In most cylinders or other metal containers, a considerable amount of scale and foreign matter accumulates, and this collects in many cases on valve seats and prevents closure of the valves after water is released, and when any valves are left open where salt air is circulated, such air enters the valve ports and causes rust on the interior walls.

It is therefore among the objects of this invention, to provide a device whereby all accumulated water may be quickly drained automatically from such cylinders and containers before any injury can be caused thereby, and without loss of steam.

A further object is to provide valves for draining such accumulations of water automatically by thermostatic bimetal springs to be actuated by changes in temperatures for opening the valves to discharge such water, and when steam is applied to close such valves before loss of the steam; and to provide means for externally adjusting the position of the valves relative to the seats for operation in accordance with the degrees of temperature that may be applied to the springs; and further to provide sufficient outlets for the escape of the water under the respective steam temperatures applied. When a moderate degree of heat is applied to such spring it will not contract or travel as far down as from a higher degree of heat; and for the low degrees of heat the valve must be made to seat with less travel movement. It is therefore necessary to provide that the valve shall close under either conditions and be elevated also sufficiently to give free release of the water before the valve is closed down upon its seat.

Still further objects are to provide means for equalizing the pull of vacuum against the valves when the discharged water is to be drawn into condensers, as on marine engines, and to provide means for closing the outlets while the valves are open to prevent the entry of salt air and injurious vapors into the cylinders; another object is to provide screens to prevent scale and foreign solid matter from reaching the seats of the valves, with means for removing the screens for cleaning the same while the cylinders are in operation. A still further object is to connect such devices to the cylinders by suitable means which may be released in event of emergencies when pressure in the cylinders might otherwise cause the heads of the cylinders to be dislodged, or other damage caused.

With these and other objects to be hereinafter shown, I have illustratively exemplified my invention by the accompanying drawings, of which:

Fig. 1 is a simplified form in section, partly in elevation of one form of the invention.

Fig. 2 is a reduced transverse section, taken on line 2—2 of Fig. 1.

Figure 3 is an enlarged perspective view of the bi-metal spring;

Figure 4 is an enlarged perspective view of the valve stem support.

Figure 5 is a front elevation view of a modified form of the invention in section, with additional parts.

Figure 6 is a reduced sized cross section view, taken on lines 6—6 of Figure 5.

Like characters on the different figures represent like parts. The letter A represents the bottom wall or base of any steam cylinder or container to be drained. From this a nipple or conduit 10 is extended downward and carries a head or plug 11, which is pressed into a cap plate 12, of a housing generally designated as B in Figure 1, and B' in Figure 5, in which operative parts of the device are mounted. The housing comprises a relatively short tube 13 and 13' for side walls and carries internal threads at each end thereof. The top thread is connected to the cap plate, and the lower thread is connected with upturned flanges 14 of a base plate 15. This base is provided with a port 16 for the escape or drainage of water that may result from condensed steam from the container above indicated by A. The letter B on Fig. 5 for indicating generally the side walls 13' may be considered as similarly indicating the side walls 13 of Fig. 1.

The top rim of the port forms a seat 17 for a hemispheric valve 18, which normally is suspended above the seat to permit escape of any water from the chamber 19, but is closed by the effect of steam entering the chamber, as follows: The valve is operated normally by bi-metal spring generally indicated by C of substantially U shape horizontally disposed in the chamber. The lower leg 20 is attached by screws 21 to the plate 15, while the relatively longer leg 22 is movably disposed above the valve 18, and is provided with a hole 23 through which is slidably disposed a threaded stem 24 which is extended upward from the valve 18. The spring is preferably a bi-metal structure adapted to bend down or retract the upper leg when heat is applied thereto.

The valve 18 is operatively connected with the spring by a thin resilient strap which is folded over the outer end of the leg 22, in the general form of a V comprising an upper arm 25 and a lower arm 26 provided with holes 27 and 28 respectively therethrough for free disposition over the stem. The arms are normally inclined to diverge from each other, so that after being positioned manually over the stem they tend to bind in the threads on the stem and thereby sustain the valve in various positions as may be desired below the leg 25, by the turning of the stem. The adjustments or positions of the valve above the port may be made without removal of the base plate by means of a spindle 29 which is extended from the valve down through and below the port thus providing manual facility for turning the spindle, valve and stem simultaneously and shifting the position of the valve in relation to the seat as the stem rides up or down through the holes in the arms thus carrying the outer end of the spring up or down and placing the valve in position to be closed down upon the seat by various degrees of heat from steam that may enter the chamber and effect the action and movement of the spring.

When it is desired to close the port by a low degree of heat the valve is drawn down by the spindle to a position relatively near the seat but leaving sufficient space below the valve for the escape or discharge of water from the chamber through the port. When a high degree of heat or steam is to be applied to the spring it is necessary that the valve be set at a higher point above the seat so that when the spring is affected by the greater heat the spring and valve will necessarily travel a longer distance down and provide sufficient time for the escape of any accumulated water to pass through the port before the valve is seated. It will be understood that when the stem is threaded up through the holes in the legs that the valve will be carried upward away from the port for use under a high degree of heat, and reverse movement of the stem will carry the valve down nearer to the seat for closing the same under a low degree of heat affecting the spring. This is an important feature of the structure to be considered, as without such means for regulating the relative position to the valve, a different device would be required for operation under different degrees of heat from steam that might enter the chamber from a cylinder above.

In cases where the cylinder or other steam container to be drained would be left unused or empty for considerable periods of time in salt air surroundings, it is important to prevent the salt air from entering the cylinder and corroding the same. For that purpose an air lock may be provided in form of a thin disc 30, which is slidably disposed over the spindle and is supported across the base of the port by a relatively light spring 31 disposed above jamb nuts 32. This spring is readily compressed by the slight weight of any water on the top of the disc and so permits the escape of all water from the port and is merely sufficient to uphold the weight of the disc against the lower face of the port.

In order to intercept scale or particles of rust or solid matter that may descend from the cylinder and thus prevent the accurate seating of the valve when the same is lowered, it is advisable to provide a screen 33 which is positioned across the chamber above the valve and stem. This screen may be taken out and cleaned by the removal of the base plate.

In ordinary operation when condensate enters the chamber the temperature will be reduced to the temperature thereof and the spring will raise or sustain the valve above the seat and provide free escape for such condensate as from the cylinder. The valve will also remain elevated when the chamber is cool but when any steam flows down from the cylinder the leg 22 quickly retracts or bends downward and closes the valve upon the seat and the additional pressure from the steam maintains the valve in closely seated condition and effectually prevents the loss of any steam. As soon as the chamber cools again the leg rises to its normal position whereby the valve is held suspended in spaced relation above the seat.

In cases where it is desired to conduct the condensate to a condenser to be reheated for steam as commonly done with marine engines, additional structure may be provided as shown in Fig. 5. An elbow or suction pipe 40 is then connected into the base of the discharge port which may be connected to any exhaust tube or other suction pipe—not necessary to be shown. In such construction it is necessary to balance the valve 18 against the pull of suction from the pipe 40 and for that purpose a light helical spring 41 is mounted around the port to contact the valve above the seat when it may be drawn down to that point by the suction. But the spring 41 is not sufficient in resiliency to impede the pressure from the bi-metal spring when affected by heat in the chamber and will readily overcome the pressure from the spring to seat the valve. A flange 42 is extended from the rim of the valve 18 to meet the spring 41 when the valve is drawn down toward the port 17. The elbow is provided with a plug 43 threaded in boss 44 beneath the spindle for removable disposition when the spindle is to be manually turned by any simple tool.

Where the port 16 may be closed by the elbow and the chamber and cylinder be empty or not in use it is advisable to provide means to prevent the salt air from entering the cylinder. This is preferably accomplished by a globular valve 45 normally supported across the mouth 46 of the conduit from the cylinder, by means of a relatively weak spring 47 connected by screws 47' to a cross web 50. This spring has tension only sufficient to support the valve and is yieldable by the weight of any accumulation of water above the same whereby such water flows down through the upper chamber 48 and port 49 in the web into the lower chamber 19 for escape through the port 16 as first described.

When it is necessary to remove the screen for cleaning while the cylinder is being operated with heated steam the port 49 may be closed by the valve 45 whereby the lower face thereof 51 will be seated on the rim 49' of the port 49 and thereupon the pressure of the steam from the cylinder will hold said valve and face 51 securely on the seat and prevent an escape of steam below the valve by the pressure thereof. The base plate 15 may then be removed and the screen cleaned while the cylinder is in regular operation. In order to lower the valve 45 a rod 52 is extended therefrom outward through the wall 13' and provided with a hand wheel 53 for turning the rod. The inner end of the rod carries a short lever 55 which is slidably disposed through an inverted V shaped slot 56, in a downturned end 57 of the spring 47. Thus when the rod is turned toward the left the crank bends the spring downwardly till the valve face 51 is seated over the port 49. A post 57 is extended above the web behind the center line of the rod and when the crank comes into contact with the base of the post the valve will be latched until released by the manual turning of the wheel 53 and thus prevent the passage of steam below the same when the pressure of the steam above is insufficient to hold valve 51 on the seat. When the crank is turned in the opposite direction the valve will be carried up to its original position and prevent the entrance of any salt air or vapors into the cylinder. Such valve when seated upon the port 49 will also prevent the loss of suction power that may be exerted through the elbow when the cylinder is not in operation. In order to prevent loss of steam around the rod through the wall 13', any suitable packing shown as 58 is used, which may be compressed by an ordinary gland 59.

From the foregoing description it will readily be understood by those skilled in the art that such construction and operations provided for will greatly facilitate the operation and use of steam cylinders and other containers for steam. In any case where a large quantity of condensate may have formed in a cylinder sufficient to disrupt the cylinder heads on the movement of the ordinary piston before such condensate could pass through the conduit and ports of the device then the plug on the end of the upper conduit may be withdrawn by the force of the pressure from the piston and the device be dislodged from the plug, which is pressed into the top cap to a stand more than usual stress in operation, but removable before such pressure has reached the danger point for injuring the cylinder.

Having described my invention I claim as new:

1. A device for draining condensate from steam cylinders and the like, comprising, a housing connected by a conduit below a steam cylinder and enclosing a chamber for receiving the condensate, said chamber having a port through the base thereof for discharging the condensate therefrom, a bi-metal spring supported over the floor of the chamber and having one end thereof movably disposed in spaced relation over the floor of the chamber for actuating a valve, a valve normally suspended by the spring in spaced relation over the port, and the said bi-metal spring being thermally adapted to depress the valve and close said port when temperature in the chamber reaches a predetermined degree of heat to prevent the loss of steam from the port, a spindle extended from the valve downward through said port for outside manual adjustment of the valve to vary the distance between the spring and the valve for closing the port under varying degrees of heat, means for balancing the valve against pull of vacuum from below the port when connected with a suction pipe, a screen mounted over the valve and port to prevent solid matter from the cylinder interfering with accurate seating of the valve, together with means for preventing salt air and deleterious vapors entering the cylinder through the conduit, when the cylinder is idle.

2. In an apparatus for draining condensate from a steam cylinder, and the like without loss of steam, comprising, a housing connected to the base of the cylinder by a conduit, said housing enclosing two chambers one above the other separated by a partition web through which a duct connects the chambers, a hemispherical valve supported in the lower chamber for opening and closing a port in the base thereof, for the discharge of condensate and for the prevention of loss of steam, a bi-metal member mounted on the floor of the lower chamber adapted to lift the valve for discharge of condensate and thermally adapted to close the valve when steam enters the chamber to prevent loss of the steam, a screen disposed over the valve to prevent solid matter from the cylinder interfering with the closing of the valve together with means for removing the screen for cleaning while the engine is in operation including a globular valve affixed to and normally supported by a relatively weak spring across the mouth of the conduit to prevent entrance therethrough of deleterious vapors into the cylinder, one end of said last described spring attached to the floor of the upper chamber and the other end adapted to be bent down for closing the duct by the lower face of the globular valve, a lever operatively connected to the upper end of the spring and having a crank arm and a rod extended therefrom to outside said upper chamber for manual depression of said spring and globular valve for closing said duct, to prevent the loss of steam therethrough and to facilitate the cleaning of the screen while the cylinder is in operation.

3. A device including the structure described in the foregoing claim 2, together with a tubular elbow connected to said discharge port for conducting condensate by suction therethrough, a helical spring mounted beneath the hemispherical valve for supporting such valve and balancing the same against the pull of such suction, to facilitate the regular operation of the valve by said bi-metal member, a removable plug in the bottom of the elbow to provide access to a spindle extended from the hemispherical valve for adjusting the same.

4. A device for draining condensate from steam cylinders and the like, including, a housing, a conduit for connecting the housing to the base of a cylinder for passage of condensate from the cylinder, said housing having a chamber therein having a port through the base thereof for discharge of the condensate, a valve normally suspended above the port for closing the same, a bi-metal spring with one end attached to said base and the other end operatively connected to the valve and thermally adapted to depress the valve and close said port when temperature of said chamber is raised to a predetermined degree; together with means for regulating the position of said valve beneath the free end of said spring, including a threaded stem extended upward from the valve through an aperture in the spring, a resilient strap in V formation and having holes through each end thereof for slidable disposition over said stem when the sides of the V are pressed toward each other, said sides being adapted to separate when released and bind the ends thereof in the threads on the stem, said strap being folded over the outer and free end of said spring with one end below and the other above said spring for raising and lowering the valve in relation to the bi-metal spring when the stem is turned; a spindle extended downward from the valve through said port for manual revolutions thereof for regulating the valve into varying positions for closing the port under varying degrees of temperature in the chamber.

JACK A. HEVA.

REFERENCES CITED

The following references are of record in the file of this patent:

UNITED STATES PATENTS

| Number | Name | Date |
| --- | --- | --- |
| 308,757 | Dingley | Dec. 2, 1884 |
| 1,310,026 | Lippert | July 15, 1919 |